United States Patent Office 3,654,250
Patented Apr. 4, 1972

3,654,250
COPOLYMERS FROM PARA TERTIARY BUTYL STYRENE AND ALPHA METHYL STYRENE AND METHOD FOR PRODUCING SAME
Bernard J. Davis, Pass Christian, Miss., assignor to Reichhold Chemicals, Inc., White Plains, N.Y.
No Drawing. Filed Nov. 17, 1969, Ser. No. 877,516
Int. Cl. C08f 15/04
U.S. Cl. 260—88.2 C                9 Claims

ABSTRACT OF THE DISCLOSURE

Resinous copolymers of para tertiary butyl styrene and alpha methyl styrene are prepared by reacting (A) para tertiary butyl styrene and (B) alpha methyl styrene in the presence of a Friedel-Crafts catalyst at a temperature ranging from about 5° C. to about 55° C. and recovering these resinous copolymers. These resinous copolymers are colorless, and have softening points up to about 140° C. and are soluble down to about 0° C. in odorless low-kauri butanol (KB) value solvents.

---

The present application is related to the following applications of Bernard J. Davis: (1) Ser. No. 876,079, filed Nov. 12, 1969, now abandoned, entiteld "Novel Modified Piperylene Resins and Iethod Therefor"; (2) Ser. No. 877,526, (Case 1) filed Nov. 17, 1969, entitled "Copolymers From Para Tertiary Butyl Styrene and a Diolefin and Method for Producing Same"; and (3) Ser. No. 877,514, filed Nov. 17, 1969, now abandoned, entitled "Para Tertiary Butyl Styrene and Terpene Copolymer Resins and Method of Producing Same" (Case 3).

The invention relates to resinous copolymers of para tertiary butyl styrene and alpha methyl styrene and to their method of production.

More particularly the invention relates to the preparation of resinous copolymers of para tertiary butyl styrene and alpha methyl styrene by reacting (A) para tertiary butyl styrene and (B) alpha methyl styrene in the presence of a Friedel-Crafts catalyst at a temperature ranging from about 5° C. to about 55° C. and recovering these resinous copolymers. These resinous copolymers are colorless, and have softening points up to about 140° C. and are soluble down to about 0° C. in odorless low-kauri butanol (KB) value solvents.

The primary object of the invention is to provide hard copolymers of para tertiary butyl styrene and alpha methyl styrene, said copolymers being water white in color; of excellent solubility in a variety of solvents, particularly in exteremely low solvency hydrocarbon solvents, independent of the melting point of the resin. Such solubility characteristics are demonstrated at low, ambient and high temperatures; the copolymers are easily prepared and may vary in melting points from viscous liquids to hard friable solids with a melting point of about 140° C.

A further object is to provide a method for producing such polymers in accordance with the foregoing object that is simple, easily practical, resulting in excellent yields and amenable to batch or continuous processing.

The copolymers of this invention are preferably formed by contacting the para tertiary butyl styrene and alpha methyl styrene monomers with boron trifluoride. Other catalysts such as boron trifluoride etherate, phosphorous penta fluoride, aluminum chloride, aluminum bromide, stannic chloride, alkyl stannic chloride, vanadium oxychloride, vanadium chloride or any Friedel-Crafts catalyst or mixtures thereof may be employed. For most purposes, it is preferred that the reactants be employed in the ratio of from about 30% to about 40% para tertiary butyl styrene to about 70% to about 60% alpha methyl styrene, because this represents the ratio of monomer feed that analysis demonstrates to be present in the final polymer. Higher ratios of either monomer tend to produce linear blocks of such polymers that are detrimental to the characteristic solvency requirements, markedly more when the ratio of alpha methyl styrene is increased. Increases in para tertiary butyl styrene reduce yields with less effect on solvency. The proportion of about 30% to about 40% para tertiary butyl styrene to about 70% to about 60% alpha methyl styrene results in copolymers of optimum freedom from color, odor, excellent solubility and compatibility particularly with paraffin waxes, and insures excellent yields.

The character of the polymer, particularly the resulting melt point may be controlled by various ways. For example, the high exothermic reaction is moderated by use of an inert organic diluent as a reaction medium. Such inert solvents may be aromatics such as benzene, toluene, xylene, and higher aromatics including those prepared from petroleum and marketed under the trade name "Solvesso," such as Solvesso 100 or Solvesso 150, or they may be aliphatic solvents, naphthas or mixtures such as VM&P naphtha or mineral spirits or mixtures of any of the foregoing. VM&P naphtha is an intermediate blend of aliphatic and aromatic hydrocarbons having a boiling range of about 240° F. to 280° F. and is available from a large number of suppliers including Humble Oil and Refining Company. The letters "VM&P" denote "Varnish Makers & Painters" and VM&P naphtha is a well known commercially available product and is defined in Reinhold's The Condensed Chemical Dictionary, 6th edition, (1961) on page 777. It has been found that the use of aliphatic solvents such as heptane provide slightly higher melt point resins than do aromatics. "Solvesso" is a trademark for well known commercially available products referred to in Reinhold's "The Condensed Chemical Dictionary, 6th edition" on page 1061 and such products are aromatic solvents prepared from petroleum.

The character of the resin may also be varied by control of the reation temperature through use of external cooling or reflux cooling at various levels during the reaction.

In general, at any given temperature, the higher the concentration of the reactants the lower the softening point, the higher the concentration of catalyst, the lower the softening point; and the lower the reaction temperature, the higher the softening point. By such controls, resins can be produced with softening points ranging from viscous liquids to hard friable solids of about 140° C.

In the preferred practice of this invention, boron trifluoride gas is bubbled into the solution of the monomers.

Although for most purposes 0.05 to 0.1 percent by weight based on the monomers suffices, larger amounts may be employed up to 1.0%, though economy and ease of removal dictate an upper practical limit of about 0.3%. If a liquid catalyst is preferred, any catalytic addition compound of $BF_3$ such as the etherate can be employed. The temperature of the reaction is controlled by external cooling. The temperature may range from about 5° C. to about 55° C. However, the preferred reaction temperature is between about 15° C. and 16° C., because outstanding results are achieved therefrom.

The solvents employed should be free of dissolved solids, olefins and water to get maximum reaction efficiency and clarity of product. Similarly, the monomers should be polymer free and contain no more than 50 p.p.m. water.

The resinous copolymers produced in the reaction are recovered by various methods that are conventionally practical in the art. Thus, the $BF_3$ is neutralized with hydrated lime or lime and a clay such as attapulgus clay or fullers earth. About 0.1% of lime and 0.1% clay is required based on the monomer weight, where 0.05% $BF_3$ is employed. Thus the amount of clay and lime can be varied in direct proportion to the amount of catalyst employed. In this practice, the lime is added first, then the clay and the mixture heated to 60–65° C. and held at this temperature for ½ hour. The mixture is then filtered. The filtrate is then inert gas sparged to 220° C. and steam distilled to 250° C. Steaming is continued until a water to oil ratio coming through the condenser is 25:1.

In this manner a crystal clear, white resin is produced that is soluble in extremely low solvency solvents down to a temperature of about 0° C. The resins of this invention differ from those now practical in the art by virtue of the fact that the resins of this invention exhibit such solvency independent of their melting point, while those currently practiced in the art are soluble in extremely low KB solvents under the aforementioned conditions with a melt point not higher than 100° C. Such extremely low solvency solvents are hexane, heptane, odorless mineral spirits and Isopar solvents as marketed by Standard Oil of New Jersey. Such solvents have a kauri butanol (KB) value of 27. Resins of this invention ranging in melting point from solids of about 140° C. are completely soluble and retain solvency in such solvents down to about 0° C. Resins currently practiced in the art are only soluble under these conditions with melting points not higher than 100° C. Such resins claim solubility at higher melting points up to 130° C. in so-called low-odor solvents. These are reduced odor mineral spirits, not odorless mineral spirits, and they have kauri butanol values ranging from 32 to 35; hence some aromatics are necessary to dissolve these resins that are not necessary for stable solutions of the resins of this invention.

As to control of the softening point of the resin, as a most convenient method the following relationship was established. When run in xylol at 50% monomer concentration, a reaction temperature of 15° C. provides 140° C. melting point. Every degree higher provides a softening point 1° C. lower. Thus to produce a 100° C. melting point resin, a reaction temperature of 55° C. is employed.

Direct addition of catalyst to the monomer solvent mixture provides 5° C. higher melting points as compared to addition of the monomer mix to the solvent-catalyst mix at the same temperature. The following example is typical of a reaction of this invention.

EXAMPLE I

To a 5-liter flask equipped with stirrer, thermometer, inert gas inlet, reflux condenser and catalyst addition sparge tube was added 1500 grams xylol dried to 50 p.p.m. $H_2O$. To this was added 975 grams of polymer free, dry, para tertiary butyl styrene and 525 grams of polymer free, dry, alpha methyl styrene. The mixture was stirred under a $N_2$ blanket and cooled by an external bath to 10–12° C. $BF_3$ gas was then introduced through the sparge tube with intensive mixing and at a rate sufficient to maintain 15–16° C. until 1.5 grams had been introduced.

When all of the gas had been added, 15° C. was maintained for ½ hour. 3.0 grams lime was added, stirred 15 minutes and then 3.0 grams attapulgus clay was added and the temperature raised to 60–65° C. and held for ½ hour. The mixture was then filtered and inert gas sparged to 220° C. then steam sparged to 250° C. Steam sparging was continued until the distillate showed 25 parts water to 1 part oil. The resin was then poured. The resultant resin was water white and crystal clear. Yield was 97.5% based on monomers. The resin has a bromine value of zero and a softening point of 140° C. It was soluble in Isopar K (27 KB) at 0° C. The properties of such resins indicate utility in coatings, sanding sealers, pressure sensitive adhesives, hot melt coatings and adhesives chewing gum, adhesives and xerography. Isopar K is manufactured by Humble Oil & Refining Co. It is an isoparaffinic hydrocarbon having an aniline point of 185° F., a KB value of 27, a viscosity, cps. at 25° C., of 1.358 and a boiling range from 349° to 383° F.

EXAMPLE II

Reaction was run identical to reaction I except that a reaction temperature of 55° C. was employed. 98% yield of a water white polymer having a melt point of 100° C. was obtained.

EXAMPLE III

Reaction was run identical to reaction II except that an identical weight of phosphorous pentafluoride was employed as the catalyst. 97% yield of a water white resin having a 100° C. softening point was obtained.

EXAMPLE IV

Reaction was run identical to Example II except that heptane was employed as the reaction solvent. 96% yield of a water white polymer having a 102° C. softening point was obtained.

EXAMPLE V

Reaction was run the same as Example II except that 2% anhydrous aluminum chloride was employed as the catalyst. A yield of 98% water white resin having a softening point of 98° C. was obtained.

What is claimed is:

1. A method of producing resinous copolymers having improved properties comprising reacting (A) para tertiary butyl styrene and (B) alpha methyl styrene in the presence of a Friedel-Crafts catalyst at a temperature ranging from about 5° C. to about 55° C. and recovering said resinous copolymers wherein the reaction is performed in the presence of an inert organic solvent and wherein the amount of (A) ranges from about 30% to about 40% and (B) ranges from about 70% to about 60%, based on the finished resin.

2. The method of producing resinous copolymers according to claim 1 wherein said solvent is at least one member selected from the class consisting of benzene, toluene, xylene, aromatic solvents prepared from petroleum, VM&P naphtha, mineral spirits and mixtures thereof.

3. The method of producing resinous copolymers according to claim 2 wherein said solvent is xylene.

4. The method of producing resinous copolymers according to claim 1 wherein said recovery is done by neutralization and steam distillation.

5. The method of producing resinous copolymers according to claim 1 wherein the Friedel-Crafts catalyst is a member of the group consisting of boron trifluoride, boron trifluoride etherate, phosphorous penta fluoride, aluminum chloride, aluminum bromide, stannic chloride, alkyl stannic chloride, vanadium oxychloride, vanadium chloride and mixtures thereof.

6. The method of producing resinous copolymers according to claim 5 wherein the Friedel-Crafts catalyst is boron trifluoride.

7. The method of producing resinous copolymers according to claim 5 wherein the amount of said catalyst varies from about 0.05% to about 1% based upon the weight of the monomers.

8. The method of producing resinous copolymers according to claim 5 wherein the amount of said catalyst is about 0.1% based on the weight of the monomers.

9. Resinous copolymers prepared in accordance with the process of claim 1 having softening points up to about 140° C. and being soluble down to about 0° C. in odorless, low kauri-butanol value solvents.

References Cited

UNITED STATES PATENTS

| 2,723,261 | 11/1955 | Levine et al. | 260—88.1 |
| 3,137,682 | 6/1964 | Corson et al. | 260—88.2 |
| 2,698,841 | 1/1955 | McKay | 260—45.5 |

JOSEPH L. SCHOFER, Primary Examiner

R. A. GAITHER, Assistant Examiner

U.S. Cl. X.R.

260—33.6 UA